(12) United States Patent
Govindaraju et al.

(10) Patent No.: US 10,399,302 B2
(45) Date of Patent: Sep. 3, 2019

(54) PACKAGING FILM LIFE RAFT ENCLOSURE

(71) Applicant: Goodrich Corporation, Charlotte, NC (US)

(72) Inventors: Parthasarathy Govindaraju, Karnataka (IN); Rajamanikandan Sivaraman, Karnataka (IN)

(73) Assignee: GOODRICH AEROSPACE SERVICES PRIVATE LIMITED, Bangalore, Karnataka (IN)

( * ) Notice: Subject to any disclaimer, the term of this patent is extended or adjusted under 35 U.S.C. 154(b) by 0 days.

(21) Appl. No.: 15/977,305

(22) Filed: May 11, 2018

(65) Prior Publication Data

US 2018/0333936 A1 Nov. 22, 2018

(30) Foreign Application Priority Data

May 18, 2017 (IN) .............................. 201711017510

(51) Int. Cl.
*B63C 9/04* (2006.01)
*B32B 15/085* (2006.01)
*B32B 15/09* (2006.01)
*B32B 27/34* (2006.01)
*B32B 27/36* (2006.01)
*B32B 27/18* (2006.01)
*B65D 81/20* (2006.01)
(Continued)

(52) U.S. Cl.
CPC ............ *B32B 15/085* (2013.01); *B32B 15/08* (2013.01); *B32B 15/088* (2013.01); *B32B 15/09* (2013.01);
(Continued)

(58) Field of Classification Search
CPC ....... B32B 15/08; B32B 15/085; B32B 15/09; B32B 15/20; B32B 27/08; B32B 27/18;
(Continued)

(56) References Cited

U.S. PATENT DOCUMENTS 3,654,068 A * 4/1972 Muri ...................... C09J 127/06
428/462
3,712,568 A * 1/1973 Grasso ................... B64D 17/00
206/525

(Continued)

FOREIGN PATENT DOCUMENTS

WO 9640556 A1 12/1996

OTHER PUBLICATIONS

White Pages, "Technical Standard Order", Federal Aviation Administration, Apr. 13, 1984, p. 1-12.
(Continued)

*Primary Examiner* — Stephen P Avila
(74) *Attorney, Agent, or Firm* — Cantor Colburn LLP

(57) ABSTRACT

A packaged inflatable life raft includes a non-inflated life raft and an enclosure around the non-inflated life raft. The enclosure includes a film with a first layer that is innermost toward the non-inflated life raft, a second layer outer from the first layer, a third layer outer from the second layer, and a fourth layer that is outermost from the non-inflated life raft. Additionally, the first layer includes a heat-sealable polymer selected from polyethylene, polypropylene, or a halogenated polymer. At least one of the second and third layers includes a metal foil or a polymer vapor barrier. At least one of the second, third, and fourth layers includes a polyester or polyamide. At least one of the first, second, third, and fourth layers includes a halogenated polymer, or a polymer composition comprising a halogenated or non-halogenated polymer and a fire retardant.

20 Claims, 3 Drawing Sheets

(51) Int. Cl.
*B65D 75/26* (2006.01)
*B32B 15/088* (2006.01)
*B32B 15/08* (2006.01)
*B32B 15/20* (2006.01)
*B32B 27/08* (2006.01)
*B32B 27/32* (2006.01)

(52) U.S. Cl.
CPC .............. *B32B 15/20* (2013.01); *B32B 27/08* (2013.01); *B32B 27/18* (2013.01); *B32B 27/32* (2013.01); *B32B 27/34* (2013.01); *B32B 27/36* (2013.01); *B63C 9/04* (2013.01); *B65D 75/26* (2013.01); *B65D 81/2023* (2013.01); *B32B 2250/04* (2013.01); *B32B 2307/3065* (2013.01); *B32B 2307/54* (2013.01); *B32B 2307/558* (2013.01); *B32B 2307/5825* (2013.01); *B32B 2307/7246* (2013.01); *B32B 2439/40* (2013.01); *B32B 2553/00* (2013.01); *B32B 2605/12* (2013.01); *B63B 2231/00* (2013.01); *B63C 2009/042* (2013.01)

(58) Field of Classification Search
CPC ......... B32B 27/32; B32B 27/34; B32B 27/36; B63C 9/04; B65D 75/26; B65D 81/2023
See application file for complete search history.

(56) References Cited

U.S. PATENT DOCUMENTS

| | | | | |
|---|---|---|---|---|
| 4,170,675 | A * | 10/1979 | Greengrass | A62C 2/06 428/109 |
| 4,214,418 | A * | 7/1980 | Smith | E04B 1/78 53/452 |
| 4,282,276 | A * | 8/1981 | Smith | B32B 15/10 428/34.3 |
| 4,577,817 | A | 3/1986 | Hernandez | |
| 4,582,734 | A * | 4/1986 | Miller | B64D 25/14 156/157 |
| 4,726,985 | A * | 2/1988 | Fay | B32B 15/14 428/138 |
| 5,322,161 | A * | 6/1994 | Shichman | A61B 50/30 206/204 |
| 6,641,445 | B1 | 11/2003 | Jurlina et al. | |
| 2005/0058788 | A1* | 3/2005 | Dent | B65D 75/26 428/35.2 |

OTHER PUBLICATIONS

European Search Report from the European Patent Office for EP Application No. 18172828.8 dated Sep. 24, 2018, 6 pages.

* cited by examiner

PACKAGING FILM LIFE RAFT ENCLOSURE

CROSS REFERENCE TO RELATED APPLICATION

This application claims priority to Indian App. No. 201711017510, filed on May 18, 2017, the disclosure of which is incorporated herein by reference in its entirety.

BACKGROUND

Aircraft configured for transit over bodies of water are required by various regulatory authorities to carry inflatable life rafts on board for deployment in the event of a water landing or other aircraft emergency on or over the water. The life raft is typically stowed onboard the aircraft in a carrying case, bag, or other enclosure or container, which can also be the subject of regulatory requirements. For example, section 5.7 of TSO-C70a Appendix 1 issued by the United States Federal Aviation Administration specifies that the life raft should be stowed in a carrying case that meets flammability standards applied to the inflatable life raft itself Many designs and materials have been used over the years for inflatable life rafts and life raft enclosures. In addition to meeting relevant regulatory and customer specifications, there is always a desire to reduce weight of onboard aircraft equipment such as life rafts and life raft enclosures. Accordingly, the development of new materials and structures continue to be pursued.

BRIEF DESCRIPTION

According to some aspects of this disclosure, a packaged inflatable life raft comprises a non-inflated life raft and an enclosure around the non-inflated life raft. The enclosure includes a film comprising a first layer that is innermost toward the non-inflated life raft, a second layer outer from the first layer, a third layer outer from the second layer, and a fourth layer that is outermost from the non-inflated life raft. Additionally, the first layer comprises a heat-sealable polymer selected from polyethylene, polypropylene, or a halogenated polymer. At least one of the second and third layers comprises a metal foil or a polymer vapor barrier. At least one of the second, third, and fourth layers comprises a polyester or polyamide. At least one of the first, second, third, and fourth layers comprises a halogenated polymer, or a polymer composition comprising a halogenated or non-halogenated polymer and a fire retardant.

BRIEF DESCRIPTION OF THE DRAWINGS

Subject matter of this disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Figures 1A, 1B:
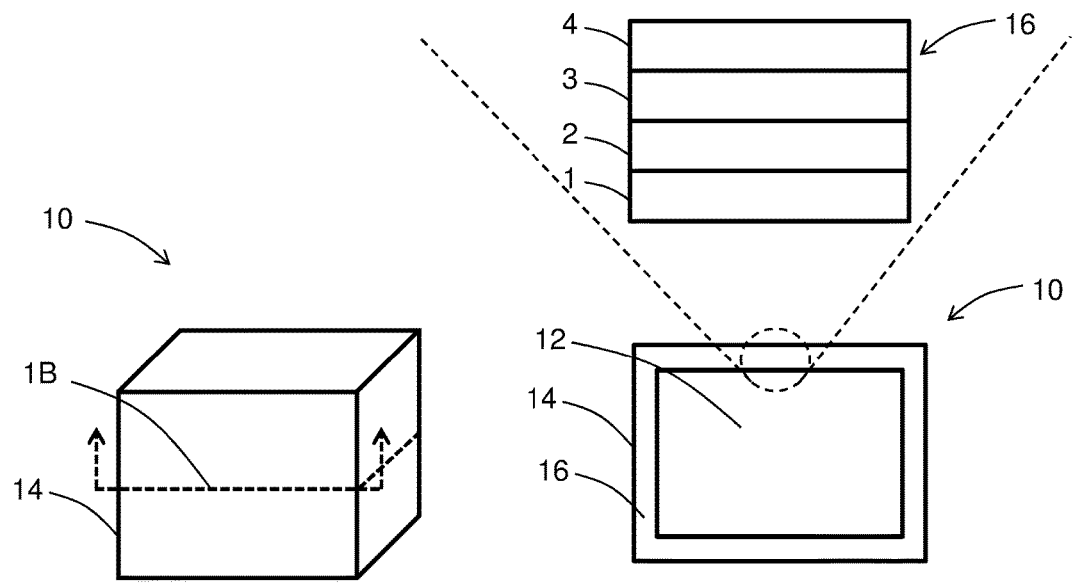
FIGS. 1A and 1B are perspective and cross-section views, respectively', of a schematic depiction of a non-inflated life raft in an enclosure.

With reference now to the Figures, in which the same or like objects numbered the same in different figures will have the same meaning or description in each of the multiple figures without the necessity of explicit repetition of such meaning or description in the description of each figures, FIG. 1A schematically shows a perspective view of a packaged inflatable life raft 10, and FIG. 1B schematically shows the packaged inflatable life raft 10 in a cross-section view taken along parting line 1B. As shown in FIGS. 1A and 1B, the packaged inflatable life raft 10 comprises a non-inflated life raft 12 in an enclosure 14 formed from a flexible multilayer film 16. As shown in the magnified portion of FIG. 1B, it is seen that the enclosure 14 is formed from a flexible multilayer film 16 comprising a first innermost layer 1, a second layer 2 over the first layer, a third layer 3 over the second layer, and a fourth outermost layer 4. Additional layers can optionally be present between the innermost layer 1 and the outermost layer 4, and in some embodiments, the film can comprise more than four layers. In some embodiments, the film consists of only four layers, as shown. In some embodiments, the non-inflated life raft 12 in the enclosure 14 can be inside of a soft valise or a hard pack (not shown) with carrying handles, for example a soft valise or hard pack in accordance with section 5.7 of TSO-C70a Appendix 1 of the United States Federal Aviation Administration. The inflatable life raft can be according to various known designs. In some embodiments, the inflatable life raft can be an inflatable life raft according to the specifications of FAR 25.1415. The above references to FAR 25.1415 and to TSO-C70, and unless otherwise specified, any other reference herein to any government or public standard including but not limited to MIL standards, RTCA standards, FAR standards, or ASTM standards, shall be to the most current version in effect at the time of the filing of this application.

As mentioned above, at least the innermost layer 1 includes a heat-sealable polymer in, allowing the film 16 to be heat-sealed to itself. As used herein, the term "heat-sealable" means a thermoplastic film surface that fluidizes or becomes tacky upon heating to a sealing temperature and contacting or pressing against another surface (including the film itself) so that it is bonded to the surface after cooling. In some embodiments, a sealing temperature can be in a range of 120° C. to 180° C. for non-halogenated heat-sealable layers or 120° C. to 180° C. for halogenated heat-sealable layers. In some embodiments, heat sealing is performed with a pressure up to 72 psi. In some embodiments, the innermost layer 1 is heat-sealable, in a wrap where two heat-sealable innermost layers 1 are brought together. Heat sealing can result in one or more seams on the enclosure 14, which are not shown, as FIG. 1 is schematic in nature and does not show details of wrapping configuration or seam locations. In some embodiments, heat sealing of the enclosure is performed contemporaneously with application of a vacuum to the enclosure to remove air from the enclosure so that the non-inflated life raft 12 is sealed in the enclosure 14 under a vacuum. As used herein, a vacuum includes any pressure less than atmospheric.

As mentioned above, the first layer 1 comprises a heat-sealable polymer selected from polyethylene, polypropylene, or a halogenated polymer. In some embodiments, the polymer composition of the first layer 1 can also be flame-resistant, as discussed below in greater detail. As used herein, the term "halogenated polymer" means a substituted hydrocarbon polymer in which one or more hydrogens of the hydrocarbon has been substituted with halogen atoms such as chlorine or fluorine atoms. In some embodiments, the halogenated polymer is an addition polymer of monomers including halogenated hydrocarbon compounds such as chlorotrifluoroethylene or chloroethane. Heat sealing films of the above polymers are commercially available, and selection of the particular polymer composition components and properties can be made by the skilled person, including such factors such as average molecular weight, molecular weight distribution, polymer branching structures, polymer cross-linking groups, or additives such as fluid polymer flow additives.

Additionally, at least one of the second layer 2 and the third layer 3 comprises a metal foil or a polymer vapor barrier. Metal foils can bonded to adjacent polymer layers by lamination, by co-extruding adjacent polymer layer(s) onto the metal foil, or by otherwise depositing a liquid or fluid polymer coating onto the metal foil. Alternatively, a metal layer can be applied to the polymer film by techniques such as vapor deposition or electroless plating. Metal foil layers can have a thickness of up to 50 μm, and can be effective to provide a barrier to the passage of gases such as oxygen or water vapor. Examples of metals for the foil layer can include aluminum or aluminum alloys. Polymer vapor barrier layers can also be used. Such polymer layers can include nanoparticles such as aligned nanoparticles platelets as disclosed in United States published patent application US 2017/0022658 A1, the disclosure of which is incorporated herein by reference.

Also, one or more of the first, second, third, or fourth layers comprises a polyamide or a polyester. Examples of polyamides include aliphatic polyamides such as nylon-6 and nylon-6,6, aromatic polyamides such as the reaction product of an aromatic diamine (e.g., 1,4-phenyl-diamine) and a di-acyl chloride (e.g., terephthaloyl chloride), or semi-aromatic such as the reaction product of an aliphatic diamine (e.g., hexamethylene diamine) and an aromatic diacid (e.g., terephthalic acid). Examples of polyesters include polyethylene terephthalate as well as other polyesters known in the art for use in packaging films. In some embodiments, the layer(s) are formed from a polyamide having a tensile strength of 28846 lb/in$^2$ to 35558 lb/in$^2$ when formed as a biaxial film of the polyamide, or polyester polymer composition having tensile strength of 22757 lb/in$^2$ to 35558 lb/in$^2$ when formed as a biaxial film of the polyester.

Additionally, one or more of the first, second, third, or fourth layers comprises a halogenated polymer, or a polymer composition comprising a halogenated or non-halogenated polymer and a fire retardant. It should be pointed out here that a single layer can fulfill more than one of the above-described functions related to this one of comprising a halogenated polymer or a fire retardant, comprising a polyamide or polyester, comprising a polymer vapor barrier layer, or comprising a heat-sealable polymer. For example, the fire retardant element can be satisfied by incorporation of a fire retardant into the polyamide or polyester layer, or by the incorporation of a fire retardant into the heat-sealable polymer layer(s) comprising polyethylene, polypropylene, or a halogenated polymer. Fire retardants can be included by blending a fire retardant compound with the polymer composition for the targeted layer in its fluid state, or can be appended (e.g., through covalent or ionic molecular bonds) to the backbone chain of the polymer macromolecule.

Examples of fire retardants include phosphorous-containing compounds such as organophosphates (e.g., tris(2-butoxy)ethylphosphate (TBEP), tris(2-propylphenyl)phosphate, organophosphonates (e.g., dimethylphosphonate), organophosphinates (e.g., aluminum diethylphosphinate), inorganic polyphosphates (e.g., ammonium polyphosphate)), organohalogen compounds (e.g., decabromodiphenyl ethane, decabromodiphenyl ether, and various brominated polymers or monomers), compounds with both halogen and phosphorous-containing groups (e.g., tris(2,3-dibromopropyl) phosphate), as well as other known fire retardants. Examples of additional fire retardants include perfluoroalkyl sulfonate salts (e.g., perfluorobutane sulfonate, potassium perfluoroctane sulfonate), $C_{1-16}$ alkyl sulfonate salts such as potassium diphenylsulfone sulfonate; carbonate salts such as $Na_2CO_3$, or $MgCO_3$, fluoro-anion complexes (e.g., $Li_3AlF_6$), and various other halogenated compounds such as 2,2-bis-(3,5-dichlorophenyl)-propane, bis(2,6-dibromophenyl)-methane, 1,1-bis-(2-chloro-4-iodophenyl)ethane, polybrominated, as well as oligomeric and polymeric halogenated aromatic compounds. Brominated fire retardants can be used in combination with a synergist such as oxides of antimony (e.g., $SbO_3$, $Sb_2O_5$) and other forms of antimony such as sodium antimonite. The amount of fire retardant can vary widely depending on the particular fire retardant or combination of fire retardants. In some embodiments, the amount of fire retardant in a layer can be in a range having a lower end of 0.1 wt. %, 0.5 wt. %, 1 wt. %, 5 wt. %, or 10 wt. %, and an upper end of 15 wt. %, 20 wt. %, 30 wt. %, or 50 wt. %, based on the total weight of polymer composition excluding filler. The above range limits can be independently combined, and all possible combinations of range endpoints are hereby expressly disclosed.

One or more of the film layers can also include an anti-fungal additive. Examples of anti-fungal additives include copper-8-quinolinate and tributyltin deratives, N-(dichlorofluoromethylthio) phthalimide, iodopropynyl butylcarbamate, laurtrimonium chloride, 10,10'-Oxybisphenoxyarsine, N-trichloromethylthio phthalimide, barium metaborate, 2,2'thio-bis(4,6-dichlorophoenol), phthaltan,2-n-octyl-4-isothiazoline-3-one, p-hydrobenzoic ester of paraben, quaternary ammonium naphthanate salts, or diphenyl anitmony 2-ethylhexoate.

Figure 2:
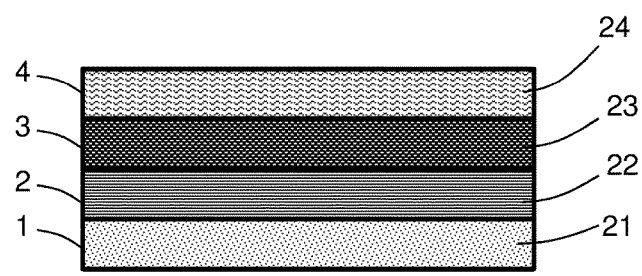
FIG. 2 is a schematic depiction of a cross-section view of an example embodiment of an enclosure film.
Figure 3:
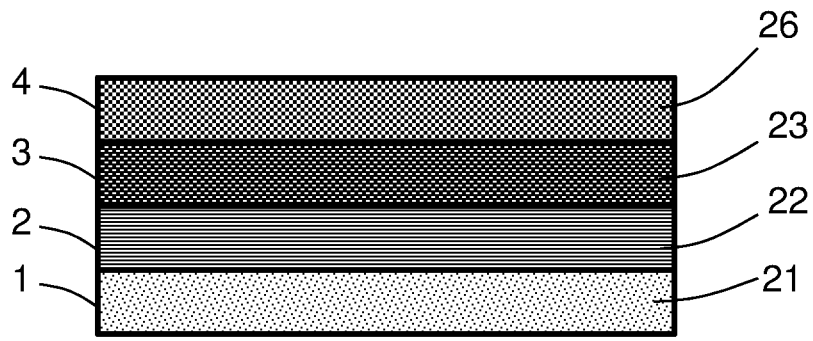
FIG. 3 is a schematic depiction of a cross-section view of another example embodiment of an enclosure film.
Figure 4:
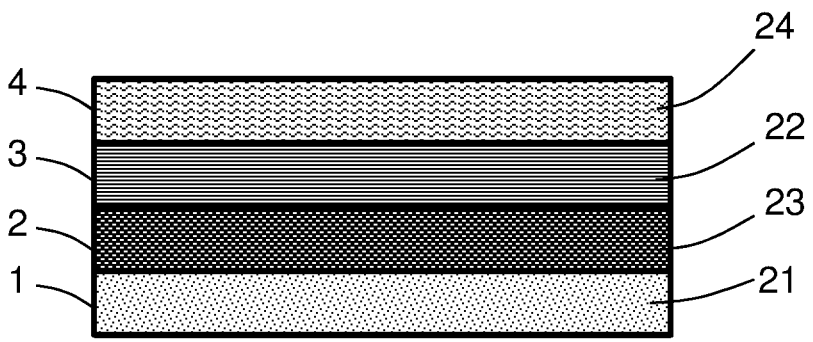
FIG. 4 is a schematic depiction of a cross-section view of another example embodiment of an enclosure film.
Figure 5:
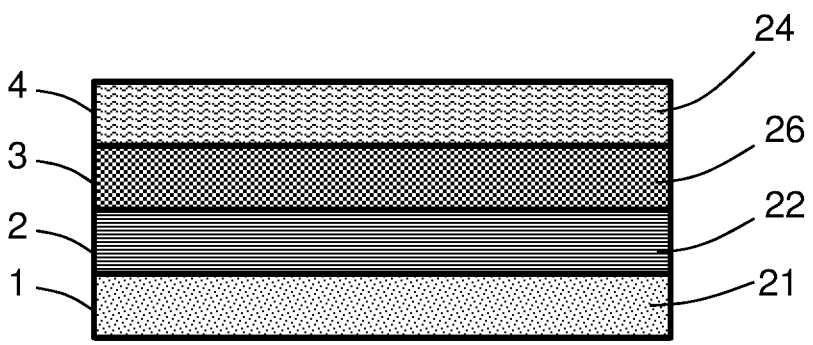
FIG. 5 is a schematic depiction of a cross-section view of another example embodiment of an enclosure film.
Figure 6:
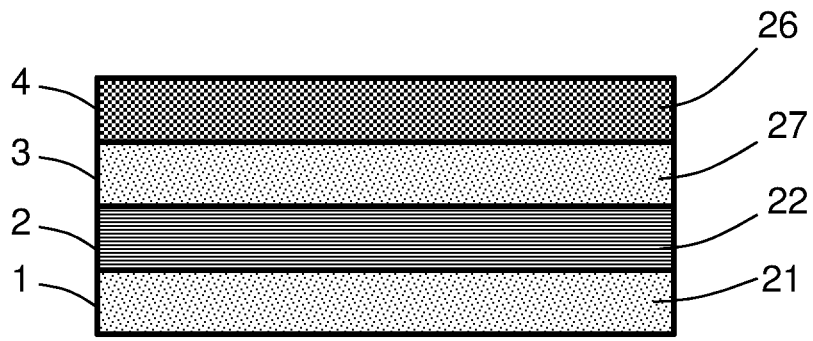
FIG. 6 is a schematic depiction of a cross-section view of another example embodiment of an enclosure film.
Figure 7:
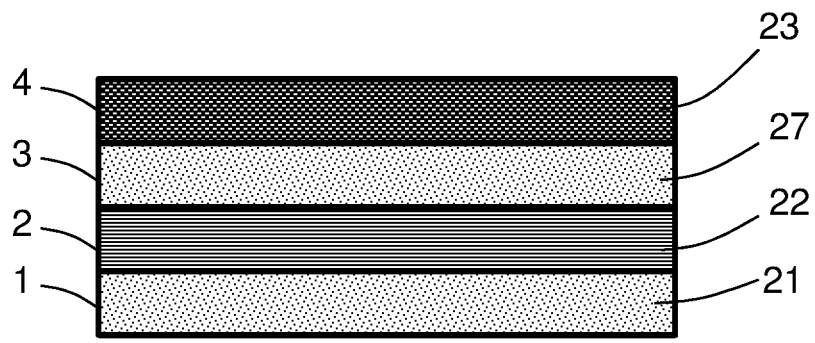
FIG. 7 is a schematic depiction of a cross-section view of another example embodiment of an enclosure film.
Figure 8:
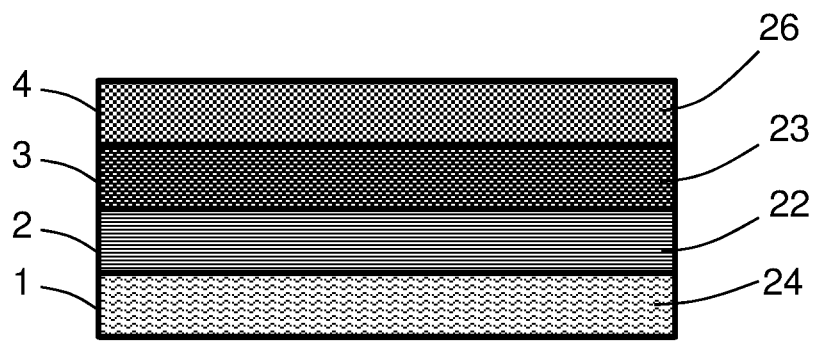
FIG. 8 is a schematic depiction of a cross-section view of another example embodiment of an enclosure film.

With reference again to the Figures, FIGS. 2-8 show various example embodiments of structures of film structures. In FIG. 2, a heat-sealable polyethylene layer 21, optionally modified for fire resistance or fungus resistance is disposed as the innermost layer 1, a metal foil layer 22 is disposed as the layer 2, a polyester (e.g., polyethylene terephthalate (PET)) layer 23 is disposed as the layer 3, and a halogenated polymer layer 24 is disposed as the outermost layer 4. In FIG. 3, a heat-sealable polyethylene layer 21, optionally modified for fungus resistance is disposed as the innermost layer 1, a metal foil layer 22 is disposed as the layer 2, a polyester (e.g., polyethylene terephthalate (PET)) layer 23 is disposed as the layer 3, and a polyamide layer 26 is disposed as the outermost layer 4. One, two, or all three of the layers 21, 23, and 26 in FIG. 3 is modified for fire resistance, e.g., with a flame retardant additive. In FIG. 4, a heat-sealable polyethylene layer 21, optionally modified for fire resistance or fungus resistance is disposed as the innermost layer 1, a polyester (e.g., polyethylene terephthalate (PET)) layer 23 is disposed as the layer 2, a metal foil layer 22 is disposed as the layer 3, and a halogenated polymer layer 24 is disposed as the outermost layer 4. In FIG. 5, a heat-sealable polyethylene layer 21, optionally modified for fire resistance or fungus resistance is disposed as the innermost layer 1, a metal foil layer 22 is disposed as the layer 2, a polyamide layer 26 is disposed as the layer 3, and a halogenated polymer layer 24 is disposed as the outermost layer 4. In FIG. 6, a heat-sealable polyethylene layer 21, optionally modified for fire resistance or fungus resistance is disposed as the innermost layer 1, a metal foil layer 22 is disposed as the layer 2, a second polyethylene layer 27 modified for fire resistance (e.g., with a flame retardant additive) is disposed as the layer 3, and a polyamide layer 26, optionally modified for fire resistance is disposed as the outermost layer 4. In FIG. 7, a heat-sealable polyethylene layer 21, optionally modified for fire resistance or fungus resistance is disposed as the innermost layer 1, a metal foil layer 22 is disposed as the layer 2, a second polyethylene layer 27 modified for fire resistance (e.g., with a flame retardant additive) is disposed as the layer 3, and a polyester layer 26, optionally modified for fire resistance is disposed as the outermost layer 4. In FIG. 8, a heat-sealable halogenated polymer layer 24 is disposed as the innermost layer 1, a metal foil layer 22 is disposed as the layer 2, a polyester (e.g., polyethylene terephthalate (PET)) layer 23, optionally modified for flame resistance, is disposed as the layer 3, and a polyamide layer 26, optionally modified for flame resistance is disposed as the outermost layer 4.

In some embodiments, the flexible film 16 can provide various technical effects, including but not limited to specified performance parameters. In some embodiments, the film meets the flammability standard of FAR § 25.853(a). In some embodiments, the film meets the fungus resistance standard of MIL-STD-810G, Method 508.7 or meets the fungus resistance standard of RTCA (Radio Technical Communication for Aeronautics) DO-160G, Section 13. In some embodiments, the film has a puncture resistance according to Federal Test Method Standard 101c, Method 2065 of at least 15 pounds. In some embodiments, the film has Elmendorf tear strength according to ASTM D1922-15 of at least 500 g. In some embodiments, the film has a tensile strength according to ASTM D882-12 of at least 5000 lb/in$^2$. In some embodiments it meets some combination or all of these embodiments.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claim:

1. A packaged inflatable life raft, comprising
a non-inflated life raft; and
an enclosure around the non-inflated life raft that includes a film comprising
a first layer, innermost toward the non-inflated life raft;
a second layer outer from the first layer;
a third layer outer from the second layer; and
a fourth layer, outermost from the non-inflated life raft;
wherein
the first layer comprises a heat-sealable polymer selected from polyethylene, polypropylene, or a halogenated polymer,
at least one of the second and third layers comprises a metal foil or a polymer vapor barrier,
at least one of the second, third, and fourth layers comprises a polyester or polyamide, and
at least one of the first, second, third, and fourth layers comprises a halogenated polymer, or a polymer composition comprising a halogenated or non-halogenated polymer and a fire retardant.

2. The packaged inflatable life raft of claim 1, wherein the non-inflated life raft is sealed in the enclosure under a vacuum.

3. The packaged inflatable life raft of claim 1, wherein the first layer comprises heat-sealable polyethylene.

4. The packaged inflatable life raft of claim 1, wherein the fourth layer comprises a polyamide, a polyester, or a halogenated polymer.

5. The packaged inflatable life raft of claim 1, wherein one of the second or third layers comprises a metal foil.

6. The packaged inflatable life raft of claim 1, wherein at least one of the first, second, third, or fourth layers comprises a halogenated polymer.

7. The packaged inflatable life raft of claim 6, wherein the fourth layer comprises a halogenated polymer.

8. The packaged inflatable life raft of claim 1, wherein
the first layer comprises heat-sealable polyethylene, optionally including either or both of a fire retardant and antifungal agent,
the second layer comprises a metal foil or a polymer vapor barrier,
the third layer comprises a polyester, and
the fourth layer comprises a halogenated polymer.

9. The packaged inflatable life raft of claim 1, wherein
the first layer comprises heat-sealable polyethylene, optionally including a fire retardant and antifungal agent,
the second layer comprises a metal foil or a polymer vapor barrier,
the third layer comprises a polyester, and
the fourth layer comprises a polyamide and a fire retardant.

10. The packaged inflatable life raft of claim 1, wherein
the first layer comprises heat-sealable polyethylene, optionally including either or both of a fire retardant and antifungal agent,
the second layer comprises a polyester,
the third layer comprises a metal foil or a polymer vapor barrier, and
the fourth layer comprises a halogenated polymer.

11. The packaged inflatable life raft of claim 1, wherein
the first layer comprises heat-sealable polyethylene, optionally including either or both of a fire retardant and antifungal agent,
the second layer comprises a metal foil or a polymer vapor barrier, and
the third layer comprises a polyamide, and
the fourth layer comprises a halogenated polymer.

12. The packaged inflatable life raft of claim 1, wherein
the first layer comprises heat-sealable polyethylene, optionally including either or both of a fire retardant and antifungal agent,
the second layer comprises a metal foil or a polymer vapor barrier, and
the third layer comprises a polyamide, and
the fourth layer comprises a halogenated polymer.

13. The packaged inflatable life raft of claim 1, wherein
the first layer comprises heat-sealable polyethylene, optionally including either or both of a fire retardant and antifungal agent,
the second layer comprises a metal foil or a polymer vapor barrier, and
the third layer comprises a polyethylene and a fire retardant, and
the fourth layer comprises a polyamide and a fire retardant.

14. The packaged inflatable life raft of claim 1, wherein
the first layer comprises heat-sealable polyethylene, optionally including either or both of a fire retardant and antifungal agent,
the second layer comprises a metal foil or a polymer vapor barrier, and
the third layer comprises a polyethylene and a fire retardant, and
the fourth layer comprises a polyester and a fire retardant.

15. The packaged inflatable life raft of claim 1, wherein
the first layer comprises a heat-sealable halogenated polymer,
the second layer comprises a metal foil or a polymer vapor barrier, and
the third layer comprises a polyester, and
the fourth layer comprises a polyamide, and optionally a fire retardant.

16. The packaged inflatable life raft of claim 1, wherein the life raft is according to the specifications of FAR 25.1415.

17. The packaged inflatable life raft of claim 1, wherein the film meets the flammability standard of FAR § 25.853(a).

18. The packaged inflatable life raft of claim 1 wherein the film meets the fungus resistance standard of MIL-STD-810G, Method 508.7 or meets the fungus resistance standard of RTCA DO-160G, Section 13.

19. The packaged inflatable life raft of claim 1, wherein the film satisfies one or more of the following criteria:
(i) A puncture resistance of at least 15 pounds,
(ii) Elmendorf tear strength of at least 500 g,
(iii) tensile strength of at least 5000 lb/in$^2$.

20. A sealable film or a sealed container comprising a film, said film comprising:
a first innermost layer;
a second layer outer from the first layer;
a third layer outer from the second layer; and
a fourth outermost layer; wherein
the first layer comprises a heat-sealable polymer selected from polyethylene, polypropylene, or a halogenated polymer,
at least one of the second and third layers comprises a metal foil or a polymer vapor barrier,
at least one of the second, third, and fourth layers comprises a polyester or polyamide, and
at least one of the first, second, third, and fourth layers comprises a halogenated polymer, or a polymer composition comprising a halogenated or non-halogenated polymer and a fire retardant.

* * * * *